May 30, 1950

A. W. MARTIN 2,509,238

THRUST REVERSING AND SPEED CONTROL
FOR JET PROPULSION ENGINES

Filed July 31, 1947

INVENTOR.
ARNOLD WOODS MARTIN

BY

*F. J. Schmitt*
Atty.

Patented May 30, 1950

2,509,238

UNITED STATES PATENT OFFICE 2,509,238

THRUST REVERSING AND SPEED CONTROL FOR JET PROPULSION ENGINES

Arnold W. Martin, Montevista, Colo.

Application July 31, 1947, Serial No. 765,221

7 Claims. (Cl. 60—35.6)

(Granted under the act of March 3, 1883, as amended April 30, 1928; 370 O. G. 757)

This invention relates to new and useful improvements in speed control mechanism for jet-propelled aircraft and other vehicles by means of directional control of the gas discharge.

In jet propulsion, when the expanding products of combustion are discharged through a restricted nozzle, the propulsive force is proportionate to the rate of combustion and the volume and velocity of the discharge. Instead of changing the combustion rate, it is sometimes more advantageous to control the volume, velocity or direction of the discharge. It is particularly desirable to slow down jet-propelled aircraft immediately before or after landing. This desideratum is effected in the device of this invention by a mechanism which changes the volume of the propulsive discharge by diverting a gradually increasing portion of it in the opposite direction.

The principal object of this invention is to provide a secondary speed control mechanism for jet-propelled aircraft consisting of a variable jet reversing means, so as to increase or decrease landing speed.

Another object of this invention is to provide controllable means to vary the mass and velocity of the jet discharge without changing the rate of combustion.

And another object of this invention is to provide quick-acting power operated mechanism to vary the propulsive or retarding force of the jet discharge without changing the rate of combustion.

And still another object of this invention is to proportionately close or open the propulsive or retarding jet discharge openings relatively and quickly by power actuation without regulating the rate of combustion.

A further object of this invention is to provide mechanically operated reversing jet discharge mechanism that is sealed against leakage in the opposite direction when the discharge is on either full propulsion or full retardation.

These and other objects of this invention, and the various features and details of the construction, operation and use thereof are hereinafter more fully set forth and described with reference to the accompanying drawing, in which like numbers refer to like parts and in which.

Figure 1:
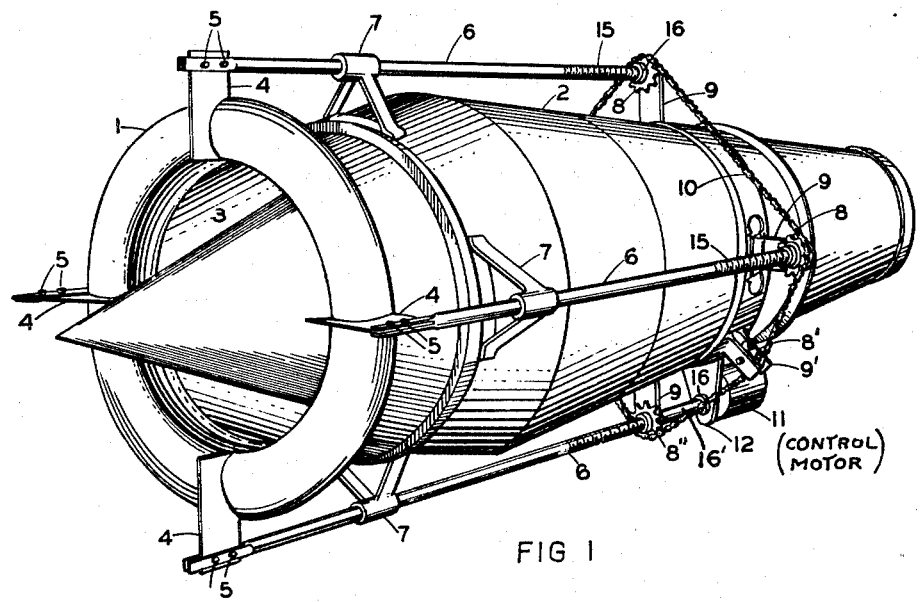
Fig. 1 is an isometric view of a jet propulsion power plant nozzle and orifice showing a longitudinally movable jet reversing ring mounted on power operated positioning rods.

Referring now to the drawing and more particularly to Fig. 1 thereof, numeral 1 indicates a transversely positioned movable annular ring the position of which determines the amount of normal thrust or retardation. Numeral 2 refers to the nozzle used to direct the flow of gases from the combustion chamber (not shown) to the orifice formed by the annular ring 1 and the cone shaped member 3. Plates 4 are secured to said annular ring 1 and by capscrews 5 to rods 6, which are supported by and slide in brackets 7 to longitudinally adjust ring 1 with respect to the cone shaped member 3. Sprockets 8 and 8' are supported by brackets 9 and 9', respectively, and the sprockets 8 by means of a screw 15 and nut 16 action with rods 6, move said rods 6 longitudinally through their supporting brackets 7 and thereby adjust ring 1 with respect to the cone shaped member 3. Sprocket chain 10 meshes with sprockets 8, 8' and 8" and is driven by motor 11 which is connected to the sprocket 8" by a long nut 16'. Bracket 12 supports motor 11 from the nozzle casing 2. As motor 11 revolves it drives sprockets 8 and sprocket chain 10 which meshes with all the other control sprockets 8 as well as 8', which is an adjustable idler sprocket to take up the slack in the sprocket chain 10.

Figure 2:
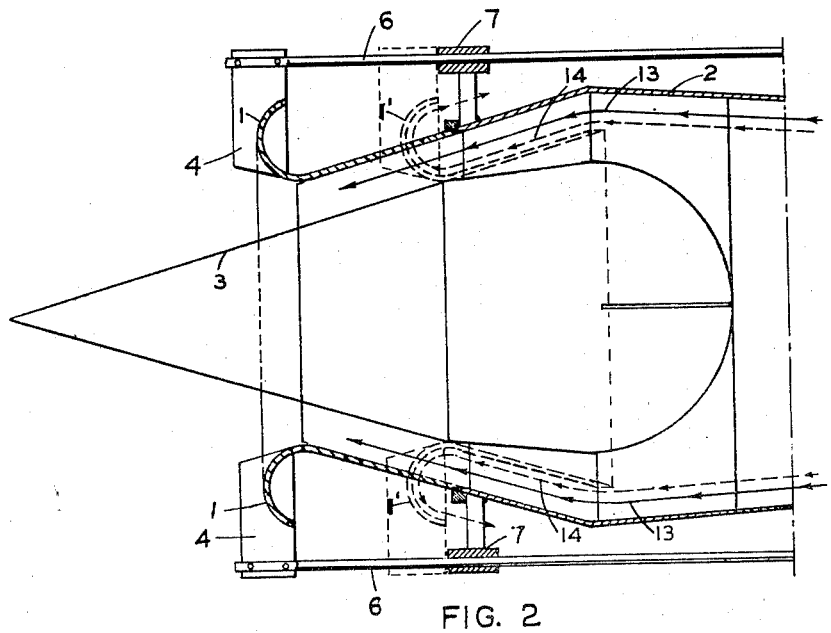
Fig. 2 is a sectional view of the aft position of the power plant showing the line of flow of gases from the nozzle and through its orifice with the reversing ring in both the normal thrust producing position and also in the full retarding position thrust, the latter shown in dotted lines.

Referring now to Fig. 2 the vectors 13 indicate the direction of the flow of gases in the nozzle 2 and through the annular orifice formed by ring 1 and cone shaped member 3 under the normal condition of thrust, while the dotted vectors 14 indicate the direction of flow of the gases when the thrust is reversed by means of the movement of ring 1 longitudinally with respect to cone member 3 to the dotted position 1'. In the extreme rearward position of the ring 1, its leading edge is in sealing relation with the trailing edge of the nozzle 2, while in its extreme forward position the throat of ring 1 is in engagement with the surface of the cone shaped member 3.

It is to be understood that various modifications and changes may be made in this invention without departing from the spirit and scope thereof as set forth in the appended claims.

The invention described herein may be manufactured and used by the Government of the United States of America for governmental purposes without the payment of any royalties thereon or therefor:

What I claim is:

1. In combintion with a jet propulsion power nozzle, a mechanism for regulating the speed of jet-propelled aircraft by gradually reversing the direction of discharge, comprising a convergent annular nozzle section having an axially movable outer wall section at the rear end of said nozzle with a trailing external flange curved outwardly and forwardly to reverse the flow of discharge gases directed along the outside of said outer wall section when it is moved forwardly, and means for adjusting said section axially between a coextensive position with the rest of said outer nozzle wall and a position in contact with the inner wall of said annular nozzle.

2. In combination with a jet propulsion power nozzle, a mechanism for regulating the speed of jet-propelled aircraft by regulating the relative portions of the discharge, which are directed in the normal and reverse directions, as defined in claim 1, wherein the external diameter of said flange is no greater than the maximum diameter of said nozzle.

3. In combination with a jet propulsion power nozzle, a mechanism for regulating the speed of jet-propelled aircraft by proportioning the amount of the discharge directed in normal and reverse directions without changing the rate of combustion, as defined in claim 2, wherein said movable section extends for approximately half the length of said nozzle.

4. In a jet propulsion power unit having a convergently directed annular discharge nozzle, an axially adjustable funnel with an outwardly turned trailing flange forming the tail end of said nozzle, and control means for axially adjusting said funnel forwardly to more or less restrict the jet discharge in the rearward direction while increasing its discharge in the forward direction without changing the rate of combustion.

5. In combination with a jet propulsion power unit having a convergently directed annular discharge nozzle, an outwardly reversely curved flange funnel, shaped and positioned to form an extension of the outer wall of said nozzle for full rear discharge, means for moving said funnel forwardly to a position where it will impinge on the inner convergent wall of said nozzle for complete reversal of the discharge, and to intermediate positions for proportionate reverse directional discharge without combustion rate changes.

6. In combination with a jet propulsion power unit having a convergently directed annular discharge nozzle, a thrust reversing device adjustable to any proportionate amount of forward or reverse thrust as defined in claim 5, and a remotely controlled motor for adjusting said device.

7. In combination with a jet propulsion power unit having a convergently directed annular discharge nozzle, a remote controlled power operable mechanism as defined in claim 6 wherein said longitudinally movable funnel is sealed by contact against discharge leakage at either the extreme forward or rearward position.

ARNOLD W. MARTIN.

REFERENCES CITED

The following references are of record in the file of this patent:

UNITED STATES PATENTS

| Number | Name | Date |
|---|---|---|
| 2,243,800 | Goodyear | May 27, 1941 |